(12) United States Patent
Vishwanath et al.

(10) Patent No.: US 7,730,095 B2
(45) Date of Patent: Jun. 1, 2010

(54) CONTROLLING TRANSACTIONS IN ACCORDANCE WITH ROLE BASED SECURITY

(75) Inventors: Tirunelveli Vishwanath, Redmond, WA (US); Max A. Feingold, Bellevue, WA (US); James E. Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 11/365,419

(22) Filed: Mar. 1, 2006

(65) Prior Publication Data

US 2007/0208741 A1      Sep. 6, 2007

(51) Int. Cl.
G06F 7/00 (2006.01)
G06F 17/30 (2006.01)
G06F 15/16 (2006.01)

(52) U.S. Cl. ...................... 707/785; 707/607
(58) Field of Classification Search ............... 707/9
See application file for complete search history.

(56) References Cited

U.S. PATENT DOCUMENTS

| 5,504,899 | A | * | 4/1996 | Raz ........................ 707/10 |
| 5,911,143 | A | * | 6/1999 | Deinhart et al. ............ 707/9 |
| 6,014,666 | A | * | 1/2000 | Helland et al. ............. 707/9 |
| 6,018,724 | A | * | 1/2000 | Arent ........................ 705/44 |
| 6,061,708 | A | * | 5/2000 | McKeehan et al. ......... 718/101 |
| 6,134,662 | A | * | 10/2000 | Levy et al. ................. 726/11 |
| 6,202,159 | B1 | * | 3/2001 | Ghafir et al. ............... 726/3 |
| 6,253,193 | B1 | * | 6/2001 | Ginter et al. ............... 705/57 |
| 6,625,601 | B1 | * | 9/2003 | Molloy ....................... 707/8 |
| 2002/0147611 | A1 | * | 10/2002 | Greene et al. ............... 707/1 |

* cited by examiner

*Primary Examiner*—Greta L Robinson
*Assistant Examiner*—Brian E Weinrich
(74) *Attorney, Agent, or Firm*—Workman Nydegger (57) ABSTRACT

The present invention extends to methods, systems, and computer program products for controlling transactions in accordance with role based security. A first transaction related component receives a transaction related message from a second transaction related component. The transaction related message indicates a request by the second transaction related component to perform a transaction related operation that is to involve the first transaction related component. The first transaction related component authenticates the second transaction related component. The first transaction related component refers to transaction control information indicating roles the second transaction component is permitted to assume relative to the first transaction related component. The transaction related operation indicated in the request is compared to the permitted roles for the second transaction related component. The transaction related operation is implemented in accordance with the results of the comparison.

20 Claims, 3 Drawing Sheets

CONTROLLING TRANSACTIONS IN ACCORDANCE WITH ROLE BASED SECURITY

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, printing documents, distributed transaction management) include the communication (e.g., the exchange of electronic messages) between a number of computer systems and/or other electronic devices via wired and/or wireless computer networks.

With more specific reference to transaction management, a feature of most, if not all, transaction processing systems is what is commonly referred to as a two-phase commit protocol. A two-phase commit protocol enables a number of different components (as part of the same transaction) to do some processing and agree on an outcome. The two-phase commit protocol also enables different components to be returned to their pre-transaction state when some error conditions occur. Since, a single transaction can update many different components (e.g., databases), the two-phase commit protocol strategy is designed to ensure that either all the components are updated or none of them, so that the components remain consistent. That is, the two-phase commit protocol attempts to maintain the atomicity of transactions by executing transactions in two phases.

Before a two-phase commit occurs the transaction is typically set up in a propagation phase. In a propagation phase, an initiator application begins a transaction and communicates with other applications, which may in turn communicate with others. Each application will receive the transaction and flow it to the next application. Applications may talk to transaction managers in order to perform propagation (e.g. marshalling and unmarshalling a transaction to and from some serialized form). Applications can also talk to resources and ask them to enlist on the transaction. Resources and other interested parties (e.g. voters) will use their transaction managers to join the transaction.

When all the activity from the propagation phase ceases, the initiator will declare the transaction complete, at which time the coordination phase can begin, using a two-phase commit.

A first phase of a two-phase commit (e.g., a prepare phase) can include requesting and collecting votes. Components that are in a state (or that subsequently transition into a state) capable of performing operations requested in a prepare message (i.e., votes YES), indicate this capability back to the transaction manager by sending a prepare complete message to the transaction coordinator. A prepare complete message further indicates that a component will remain in a state capable of applying the requested operations even if the component subsequently fails. However, if any component does not respond or responds that it is not capable of performing operations according to the transaction (i.e., votes NO), the transaction manager may abort the transaction.

A second phase of a two-phase commit (e.g., a commit phase) can include communicating outcome and receiving outcome acknowledgements. In a commit phase (after a prepare phase is successful), the transaction manager sends results (e.g., a commit or abort message) to all components participating in the transaction (i.e., any component from which the transaction coordinator received a prepare complete message). Reception of results causes a component to perform or abort any operations that were indicated as being prepared in a previously corresponding prepare complete message. After a component successfully performs or aborts the indicated operations, the component sends an outcome acknowledgement message back to the transaction manager.

Use of a transaction manager results in sole ownership of a transaction environment and a single decision maker for decisions related to the transaction. Accordingly, there is a single concept of a transaction, a single concept of an environment, and a single concept of a thread of control.

However, using of a single transaction manager is not always the most efficient way to process transactions. For example, distributing the processing of different portions of a transaction across different transaction managers (e.g., at different computer systems) can result in performance gains and reliability relative to processing a transaction at single transaction manager. Further, in some environments, use of different transaction managers may be required for various different portions of a transaction. For example, file systems operations may be required to be processed by a specialized file system transaction manager or kernel-mode transaction manger ("KTM"). Thus, when a transaction includes file system operations along with other types of operations, the file system operations are processed at the specialized file system transaction manager and the other operations are processed at a different general purpose transaction manager.

Thus, in distributed transaction environments, a transaction can involve interactions between local transaction managers at different computer systems. In some environments, the computer systems participating in a distributed transaction are under the control of the same entity, and often in close physical proximity to one another. For example, all the computer systems participating in a distributed transduction may be connected to the same Local Area Network ("LAN"). Thus, any communication between various applications and/or various transactions managers participating in a distributed transaction is typically contained inside the LAN. Accordingly, in these environments, distributed transactions rely on existing network security mechanisms for protection. For example, firewalls, isolation, network partitioning, and protocol security (e.g., IPSec) used generally to secure the LAN are deemed sufficient for protecting any distributed transaction occurring on the LAN.

As result, transaction managers implicitly trust the roles of one another and applications, since communication between transaction managers and/or applications is limited to the protected LAN environment. For example, an application acting as a transaction initiator is assumed to be authorized to act as a transaction initiator. Thus, a transaction manager that receives communication from a transaction initiator typically starts a transaction without any further security checks. Likewise, when an application indicates to a transaction manager that it is to be subordinate to a superior transaction manager (e.g., to the coordinator for a transaction), the subordinate transaction manager typically accepts this assertion without performing any further security checks.

However, many transactions include at least some communication with modules external to protected LAN environments. For example, online banking and credit card account management is frequently available through Web based interfaces on the Internet. Thus, at least some transaction modules inside a LAN are typically configured with interfaces to receive external communication that can cause a transaction to occur, such as, for example, transferring funds between bank accounts. Accordingly, when a transaction involves communication outside of a protected LAN environment default network security mechanisms are often insufficient to insure distributed transaction security.

For example, through available external communication interfaces a malicious user or program can take control of a transaction related module (e.g., an initiator, transaction manager, or resource manager) on a LAN. Inside the LAN modules may implicitly trust one another. Thus, the maliciously controlled module can gain control of other transaction modules inside the LAN, without the other transaction modules performing further security checks. Accordingly, a malicious user or program can cause maliciously control transaction modules to operate in different roles and perform different functionality. For example, if a transaction initiator module is compromised, it can assume the role of a transaction coordinator. Other transaction related modules on the LAN may implicitly trust that the initiator module can assume the role of a transaction coordinator. Functioning as a transaction coordinator, the compromised transaction initiator can destroy data and cause denial of service ("DOS") attacks at one or more other transaction related modules.

Problems can also occur in environments where "partially-trusting" various modules involved in transaction would result in a more secure transaction. For example, it may be more secure to allow certain modules to participate in a transaction without granting them full access to each role. For example, some modules might be trusted to act as participants, but not to initiate their own transactions. Failure to implement such a mechanism can result in modules assuming more unchecked authority over transactions than they should have.

Some distributed transaction environments have implemented generalized authentication and/or authorization mechanisms as a further security check when performing a distributed transaction. When exchanging distributed transaction related communication, transaction related modules authenticate one another and/or verify that other transaction related modules are authorized to participate in transactions. However, these generalized authentication and/or authorization mechanisms typically use a single white list that does not distinguish among different roles for a transaction. For example, if a module is included in the white list, the module is authorized to operate in any role, such as, for example, initiator, coordinator, propagator, and participant, for a transaction. Thus, if an authenticated and authorized transaction initiator (e.g., a transaction initiator included in a white list) is compromised, the transaction initiator can still assume the role of coordinator and have other transaction modules responsive to its communication. Thus, if a compromised transaction module is authorized to perform at least some function in distributed transactions, generalized authentication and/or authorization mechanisms may not prevent malicious activities facilitated through the compromised transaction module.

Further, as atomic transactional infrastructure becomes more lightweight and more usable, uses of the transactional paradigm and programming model are becoming more common. Transactional applications are showing up in places (e.g. the desktop) where the security assumptions that apply inside a server room no longer apply.

BRIEF SUMMARY

The present invention extends to methods, systems, and computer program products for controlling transactions in accordance with role based security. A first transaction related component receives a transaction related message from a second transaction related component. The transaction related message indicates a request by the second transaction related component to perform a transaction related operation that is to involve the first transaction related component. For example, the first transaction related component may be requested to perform an operation that succeeds or fails within the scope of a larger activity or transaction.

The first transaction related component authenticates the second transaction related component. The first transaction related component refers to transaction control information. The transaction control information indicates roles the second transaction component is permitted to assume relative to the first transaction related component. The transaction related operation indicated in the request is compared to the permitted roles for the second transaction related component. The transaction related operation is implemented in accordance with the results of the comparison.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for controlling transactions in accordance with role based security. A first transaction related component receives a transaction related message from a second transaction related component. The transaction related message indicates a request by the second transaction related component to perform a transaction related operation that is to involve the first transaction related component. For example, the first transaction related component may be requested to perform an operation that succeeds or fails within the scope of a larger activity or transaction.

The first transaction related component authenticates the second transaction related component. The first transaction related component refers to transaction control information. The transaction control information indicates roles the second transaction component is permitted to assume relative to the first transaction related component. The transaction related operation indicated in the request is compared to the permitted roles for the second transaction related component. The transaction related operation is implemented in accordance with the results of the comparison.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
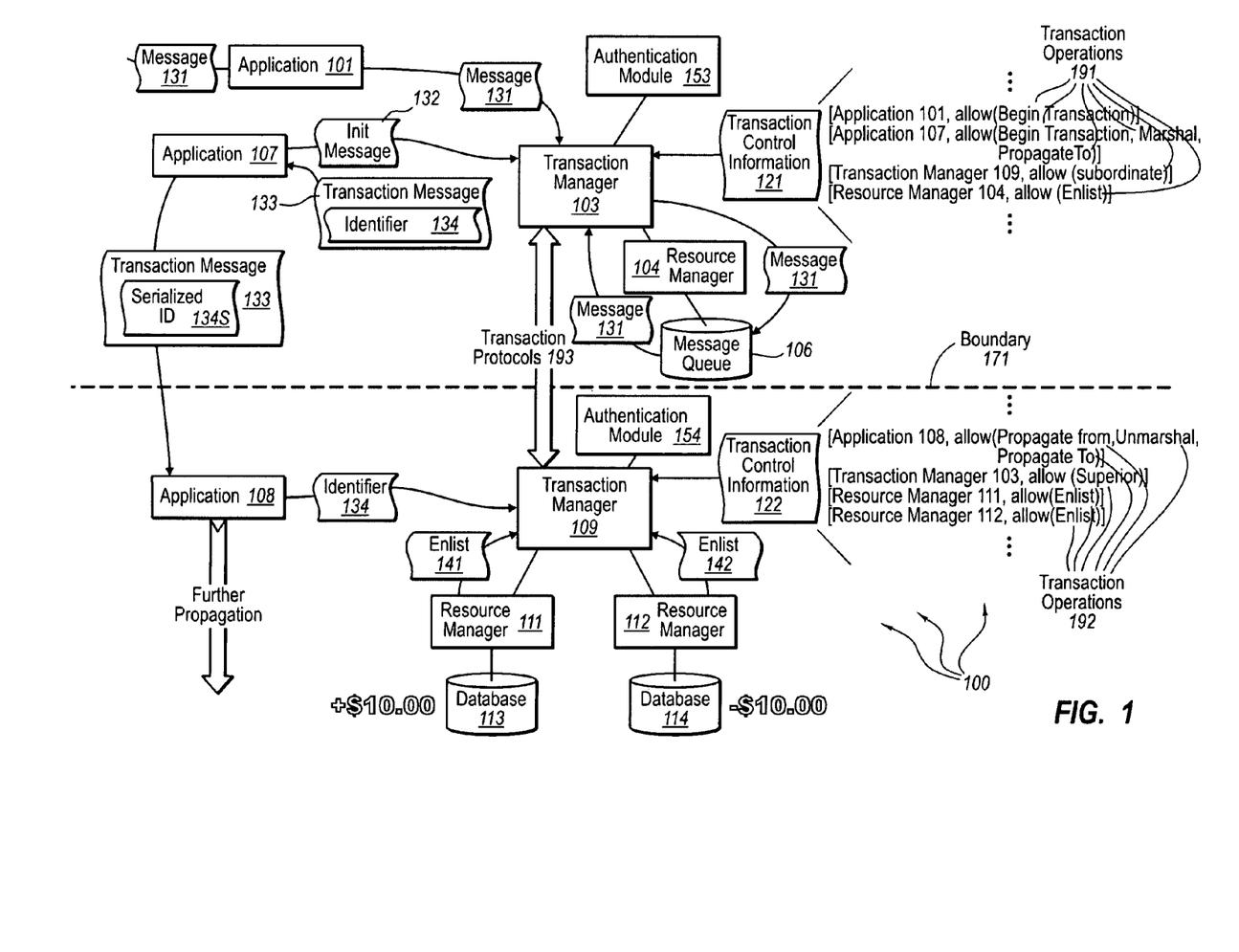
FIG. 1 illustrates an example computer architecture that facilitates controlling transactions in accordance with role based security.

FIG. 1 illustrates an example computer architecture 100 that facilitates controlling transactions in accordance with role based security. Each of the depicted components connected to a network, such as, for example, a Local Area Network ("LAN"), a Wide Area Network ("WAN"), or even the Internet. Thus, the various components can receive data from and send data to each other, as well as other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), etc.) over the network.

Components can also exchange transaction related messages using transaction protocols (e.g., transaction protocols 193), such as, for example, commit protocols, recovery protocols, and termination protocols. In some embodiments, commit protocols are implemented as Atomic Commit Protocols ("ACP"), such as, for example, a two-phase commit protocol.

As depicted in computer architecture 100, boundary 171 separates application 101, application 107, transaction manager 103, resource manager 104 and message queue 106 from application 108, transaction manager 109, resource manager 111, resource manager 112, database 113 and database 114. Boundary 171 can represent a boundary between different computer systems connected to the same network. For example, application 101, application 107, transaction manager 103, resource manager 104, and message queue 106 can be at a first computer system and application 108, transaction manager 109, resource manager 111, resource manager 112, database 113 and database 114 at a second different computer system.

Generally, it may be that application 101 and application 107 request transactions from transaction manager 103. To implement transactions, transaction manager 103 can communicate with other transaction managers, such as, for example, transaction manager 109, and resource managers, such as, for example, resource manager 104. Resource manager 104 can be configured to manage message queue 106, such as, for example, controlling when messages are queued and dequeued from message queue 106.

Thus, from time to time, transaction manager 103 can receive requests from other components requesting that transaction manager 103 perform a transaction related operation, such as, for example, establishing a superior or subordinate relationship to another transaction manager or enlisting a resource manager. From time to time, transaction manager 103 can also receive requests from other components requesting that transaction manager 103 send transaction related data to another component for processing, such as, for example, sending a transaction identifier for marshalling by an application. From time to time, transaction manager can also receive requests from other components requesting that transaction manager 103 receive transaction related data from another component, such as, for example, receiving a transaction identifier that has been unmarshaled.

Generally, transaction manager 103's response to requests from other components, as well as, whether other transaction related operations can be permitted, is indicated in transaction control information 121. Transaction control information 121 can indicate permitted roles of other components in computer architecture 100 relative to transaction manager 103 (e.g., through transaction operations 191).

For example, transaction control information 121 indicates that application 101 is permitted the role of transaction initiator with transaction manager 103 (as indicated by the entry "[Application 101, allow(BeginTransaction)]"). Transaction control information 121 also indicates that application 107 is permitted the role of transaction initiator with transaction manager 103, the role of marshaling a transaction for transaction manager 103, and the role of propagating transactions to other applications (as indicated by the entry "[Application 107, allow(BeginTransaction, Marshal, PropgateTo)]"). Transaction control information 121 also indicates that transaction manager 109 is permitted the role of subordinate transaction manager to transaction manager 103 (as indicated by the entry "[Transaction Manager 109, allow(Subordinate)]"). Transaction control information 121 also indicates that resource manager 104 is permitted the role of enlisting in transaction manager 103's transactions (as indicated by the entry "[Resource Manager 104, allow(Enlist)]").

Authentication module 153 can authenticate a component communicating with transaction manager 103. For example, when receiving message 131, transaction manager 103 can authenticate that the message 131 was sent from application 101. Once authenticated, transaction manager 103 can refer to transaction control information 121 to determine if message 131 corresponds to a permitted role of application 101. Virtually any authentication mechanisms, such as, for example, usernames and passwords, Kerberos tickets, X.509 certificate thumbprints, etc., can be used to authenticate components.

Similarly, generally, it may be that application 108 requests transactions from transaction manager 109. To implement transactions, transaction manager 109 can communicate with other transaction managers, such as, for example, transaction manager 103, and resource managers, such as, for example, resource managers 111 and 112. Resource manager managers 111 and 112 can be configured to manage databases 113 and 114 respectively, such as, for example, controlling when amounts are added and subtracted from values in databases 113 and 114.

Thus, from time to time, transaction manager 109 can receive requests from other components requesting that transaction manager 109 perform a transaction related operation, such as, for example, establishing a superior or subordinate relationship to another transaction manager or enlisting a resource manager. From time to time, transaction manager can also receive requests from other components requesting that transaction manager 109 send transaction related data to another component for processing, such as, for example, sending a transaction identifier for marshalling by an application. From time to time, transaction manager 109 can also receive requests from other components requesting that transaction manager 109 receive transaction related data from another component, such as, for example, receiving a transaction identifier that has been unmarshaled.

Generally, transaction manager 109's response to requests from other components, as well as, whether other transaction related operations can be permitted, is indicated in transaction control information 122. Transaction control information 122 can indicate permitted roles of other components in computer architecture 100 relative to transaction manager 109 (e.g., through transaction operations 192).

For example, transaction control information 122 indicates that application 108 is permitted to the role of receiving transactions propagated from other applications, the role of unmarshalling transactions for transaction manager 109, and the role of propagating transactions to other applications (as indicated by the entry "[Application 108, allow(PropagateFrom, Unmarshal, PropagateTo)]"). Transaction control information 122 also indicates that transaction manager 103 is permitted the role of superior transaction manager to transaction manager 109 (as indicated by the entry "[Transaction Manager 103, allow(Superior)]"). Transaction control information 122 also indicates that resource managers 111 and 112 are permitted the role of enlisting in transaction manager 109's transactions (as indicated by the entries "[Resource Manager 111, allow(Enlist)]" and "[Resource Manager 112, allow(Enlist)]" respectively).

Authentication module 154 can authenticate a component communicating with transaction manager 109. For example, when identifier 134 is received, transaction manager 109 can authenticate that identifier 134 was sent from application 101. Once authenticated, transaction manager 109 can refer to transaction control information 122 to determine if identifier 134 corresponds to a permitted role of application 108.

In some embodiments, roles that are not specifically permitted are inferred as being denied to a component. Thus, omitted roles in transaction control information 121 can be inferred as denied roles for a component relative to transaction manager 103. Similarly, omitted roles in transaction control information 122 can be inferred as denied roles for a component relative to transaction manager 109. In these embodiments, for example, it can be inferred from transaction control information 121 that application 101 is denied the role of marshalling a transaction for transaction manager 103 and denied the role of propagate transactions to other applications (as well as being denied any other roles not expressly allowed). Likewise, it can be inferred from transaction control information 122 that application 108 is denied the role of initiating a transaction with transaction manager 109 and denied the role of marshalling a transaction for transaction manager 109 (as well as being denied any other roles not expressly allowed).

When transaction control information does not include an entry for a component, it can be inferred the component is denied all roles relative to a transaction manager. In other embodiments, roles can be expressly denied, for example, by using "deny" in an entry.

It may be that application 101 is a Web services front end for a banking application. Thus, application 101 can receive messages requesting the transfer of funds between bank accounts. For example, application 101 can receive message 131 requesting the transfer of $10.00 from a checking account to a savings account. Application 101 can send message 131 to transaction manager 103 to initiate a transaction for storing message 131 in message queue 106. After authenticating application 101 and referring to transaction control information 121, transaction manager 103 can initiate a transaction to store message 131. Resource manager 104 can attempt to enlist in the transaction. After authenticating resource manager 104 and referring to transaction control information 121, transaction manager 103 can permit resource manager 104 to enlist in the transaction. Message 131 can then be stored in message queue 106.

Subsequently, for example, when other system resources become available to facilitate transferring $10.00 from the checking account to the savings account, application 107 can initiate a transaction to perform the transfer. Application 107 can send init message 132 to initiate a distributed transaction. After authenticating application 107 and referring to transaction control information, transaction manager 103 can initiate a distributed transaction to perform the transfer. Transaction manager can return transaction message 133 to application 107. Transaction message 133 can include message 131 and an identifier 134 identifying the distributed transaction.

Application 107 can attempt to serialize identifier 134 into serialized ID 134S for transport. After authenticating application 107 and referring to transaction control information 121, transaction manager 103 can permit application 107 to serialize (marshal) identifier 134 into serialized ID 134S. Application 107 can then attempt to propagate transaction message 133 to application 108. After authenticating application 107 and referring to transaction control information 121, transaction manager 103 can permit application 107 propagate transaction message 133 to application 108.

Application 108 can attempt to receive transaction message propagated from application 107. After authenticating application 108 and referring to transaction control information 122, transaction manager 109 can permit application 108 to receive propagated transaction message 133 from application 107. Application 108 can then attempt to deserialize serialized ID134S into identifier 134 for use by transaction manager 109. After authenticating application 108 and referring to transaction control information 122, transaction manager 109 can permit application 108 to deserialize (unmarshal) serialized ID134S. Application 108 can then submit identifier 134 to transaction manager 109.

Transaction manager 109 can use identifier 134 (along with various transaction protocols) to communicate back to transaction manager 103. As part of the communication, transaction manager 109 can authenticate transaction manager 103 and transaction manager 103 can authenticate transaction manager 109. After authenticating transaction manager 109, transaction manager 103 can refer to transaction control information 121 to determine that transaction manager 109 is permitted to be a subordinate of transaction manager 103. Similarly, after authenticating transaction manager 103, transaction manager 109 can refer to transaction control information 122 to determine that transaction manager 103 is permitted to be a superior of transaction manager 109. Through various transaction protocols, transaction manager 103 can be established as a superior to transaction manager 109 and a distributed transaction can occur to facilitate the transfer of 10.00 from the checking account to the savings account.

As part of the distributed transaction, resource managers 111 and 112 can send enlist messages 141 and 142 respectively to attempt to enlist with transaction manager 109. After authenticating resource managers 111 and 112 and referring to transaction control information 122, transaction manager 109 can permit resource managers 111 and 112 to enlist in the distributed transaction. Through various transaction protocols, $10.00 can be added to an account in database 113 (the savings account) and $10.00 can be subtracted from an account in database 114 (the checking account).

When appropriate application 108 can attempt to further propagate the distributed transaction. After authenticating application 108 and referring to transaction control information 122, transaction manager 109 can permit application 108 to further propagate transaction message 133.

Thus, embodiments of the present invention provide increased security for distributed transactions. Components can participate in distributed transactions in permitted roles that are expressly allowed. Components can also be prevented from participating in distributed transactions when attempting to participate in roles that are not expressly allowed. Thus, even if a component becomes comprised, potentially malicious operations can be prevented by referring to transaction control information at the time a transaction related operation is requested. For example, it may be that application 101 (an application configured for external communication) becomes comprised. However, application 101 can still be prevented from propagating distributed transactions (e.g., for funds transfers) to application 108 since PropagateTo is not a permitted role of application 101.

Transaction control information can be configured by an administrator to facilitate a distributed transaction topology that satisfies distributed transaction requirements for a specified environment. For example, in computer architecture 100 an administrator may have previous knowledge of the depicted components and how the depicted components are to interoperate to facilitate balance transfers between accounts. Thus, the administrator can configure transaction control information 121 and 122 to permit components to operate in an appropriate (e.g., minimum) number of different roles for performing balance transfers.

Figure 2:
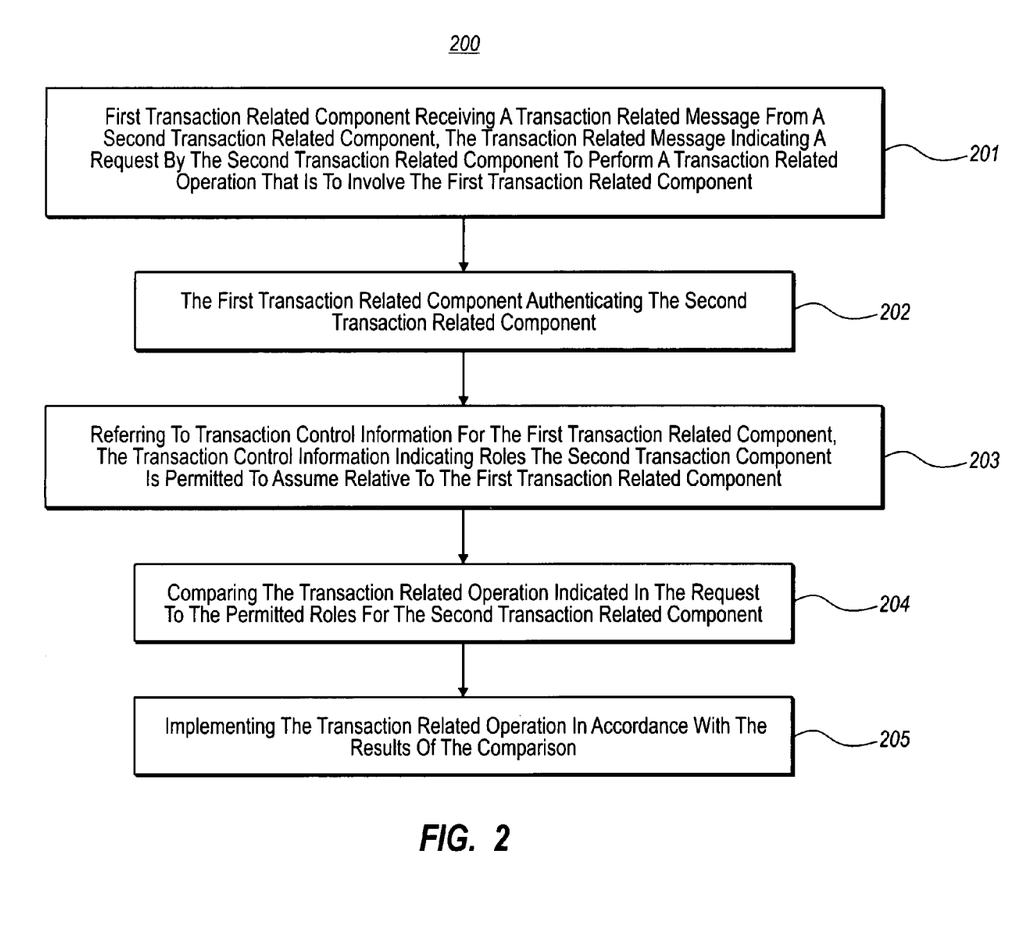
FIG. 2 illustrates a flow chart of an example method for controlling transactions in accordance with role based security.

FIG. 2 illustrates a flow chart of an example method 200 for controlling a distributed transaction in accordance with role based security. The method 200 will be described with respect to the components and data depicted in FIG. 1.

Method 200 includes an act of a first transaction related component receiving a transaction related message from a second transaction related component (act 201). The transaction related message can indicate a request by the second transaction related component to perform a transaction related operation that is to involve the first transaction related component. For example, transaction manager 103 can receive init message 132 from application 107. Init message 132 can indicate a request by application 107 to initiate a distributed transaction that is to involve transaction manager 103. For example, application 107 can request that transaction manager 103 perform an operation that succeeds or fails within the scope of a larger activity or transaction.

Method 200 includes an act of the first transaction related component authenticating the second transaction related component (act 202). For example, transaction manager 103 can authenticate application 107.

Method 200 includes an act of referring to transaction control information for the first transaction related component (act 203). The transaction control information indicating roles the second transaction component is permitted to assume relative to the first transaction related component. For example, transaction manager 103 can refer to transaction control information 121. Transaction control information 121 indicates the roles application 107 is permitted to assume relative to transaction manager 103.

Method 200 includes an act of comparing the transaction related operation indicated in the request to the permitted roles for the second transaction related component (act 204). For example, transaction manager 103 can compare initiating a distributed transaction to the entry [Application 107, allow (BeginTransaction, Marshal, PropagateTo)].

Method 200 includes an act of implementing the transaction related operation in accordance with the results of the comparison (act 205). For example, transaction manager 103 can permit application 107 to initiate the distributed transaction based on the entry including "BeginTransaction" as an allowed role.

It should be understood that is an example of controlling a distributed transaction in accordance with role bases security. Many other examples of controlling a distributed transaction in accordance with role based security have previously been described with respect to the components in computer architecture 100.

Figure 3:
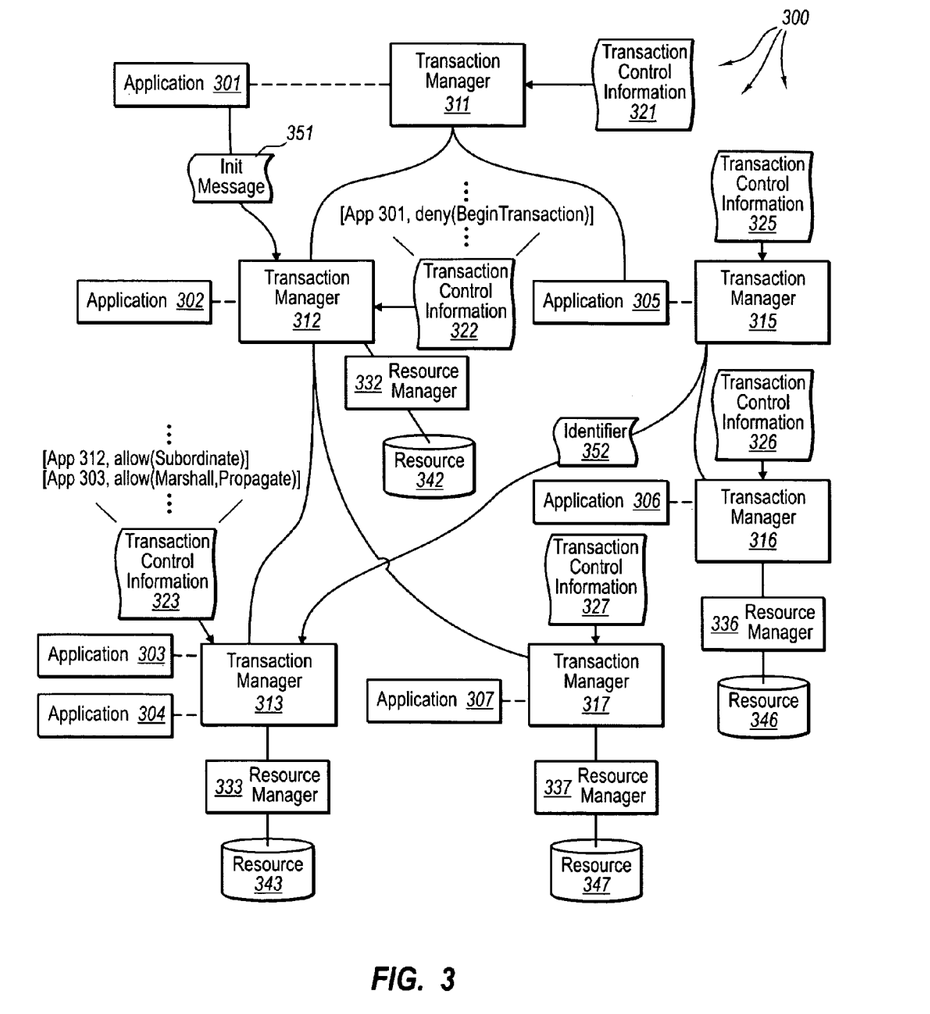
FIG. 3 illustrates a second example computer architecture that facilitates controlling transactions in accordance with role based security.

FIG. 3 illustrates a second example computer architecture 300 that facilitates controlling transactions in accordance with role based security. As depicted, computer architecture 300 includes a number of transaction managers 311, 312, 313, 315, 316, and 317 and corresponding applications 301, 302, 303 and 304, 305, 306, and 307 respectively. Transaction managers 311, 312, 313, 315, 316, and 317 also have access to corresponding transaction control information 321, 322, 323, 325, 326, and 327 respectively. Transaction managers 312, 313, 316 and 317 communicate with corresponding resource managers 332, 333, 336, and 337 respectively to implement distributed transactions at resources 342, 343, 346, and 347 respectively.

Transaction control information accessible to each transaction manager may have been configured by an administrator based on a known pattern of operation among the components in computer architecture 300 for implementing distributed transactions for a specified purpose. For example, the administrator may know that application 301 will never operate as a transaction initiator with respect to transaction manager 312 when implementing a distributed transaction for the specified purpose. Nonetheless (e.g., due to compromise or system error), it may be that application 301 sends init message 351 to transaction manager 312.

Transaction manager 312 can receive init message 351 from application 301. Init message 351 can indicate a request by application 301 to initiate a distributed transaction that is to involve transaction manager 312. In response to receiving init message 351, transaction manager 312 can authenticate application 301 and can refer to transaction control information 322. Transaction control information 322 indicates the roles application 301 is denied from assuming relative to transaction manager 312. Transaction manager 312 can compare initiating a distributed transaction to the entry [Application 301, deny(BeginTransaction)]. Transaction manager 312 can prevent application 301 from initiating a distributed transaction based on the entry including "BeginTransaction" as a denied role.

As previously described, omitting an entry for a component or omitting an allowed role in an entry for a component can infer that a component is denied from assuming that role relative to another component.

For example, it may be that transaction manager 315 sends transaction identifier 352 to transaction manager 313. Transaction manager 313 can receive transaction identifier 352 from transaction manager 315. Transaction identifier 352 can indicate a request by transaction manager 315 that transaction manager 313 participate as a subordinate to transaction manager 315 in a distributed transaction. In response to receiving transaction identifier 352, transaction manager 313 can authenticate transaction manager 315 and can refer to transaction control information 323.

As depicted, transaction control information 323 does not include an entry for transaction manager 315. Thus, it can be inferred that transaction manager 315 is denied all roles relative to transaction manager 313. Transaction manager 313 can compare the role of transaction manager 315 as a superior to entries in transaction control information 323. Since transaction control information 323 does not include an entry for transaction manager 315, transaction manager 313 prevents transaction manager 315 from becoming its superior.

Generally, transaction managers can include one or more attachment points, for example, to initiators, to local participants, to various transaction manager to transaction manager (TM to TM) protocols. Each attachment point can support a subset of possible actions. Some transaction manager to transaction manager protocols are supported through a generic gateway interface. One example protocol is WS-Atomic Transaction ("WS-AT").

At the TM to TM protocol level there are at least two security related actions: can a partner TM be a superior and can a partner TM be a subordinate. Checks at the TM to TM protocol can be performed within an operating system or as part of protocol modules that use the generic gateway interface.

For example, when using WS-AT an access control list can be stored in configuration data. WS-AT can use both Kerberos tickets and X509 certificate thumbprints to authenticate and designate principals. There are at least two actions:

Can propagate, which means that the application can provide the transaction manager with transactions that the transaction manager should join as a subordinate.

Can coordinate, which means that the partner TM can be a superior.

Can subordinate, which means the partner TM can be subordinate.

WS-AT can also provide further separation of roles, distinguishing initiators, propagators, superior TMs and subordinate TMs or RMs. WS-AT can also include in its access control lists both direct identities (e.g. a principal) and delegation rules. For example, a transaction manager may allow component A to enlist as a participant, but not to propagate the transaction to other participants. However, component B may delegate his right to enlist as a participant to any principal (e.g., component A) he feels is trustworthy. At runtime, the delegation chain presented as evidence by an unknown participant can be cryptographically verified in order for access to be granted.

An operating system can also store access control information, containing a set of entries specifying principals, actions allowed, and actions denied. Each entry can use the principal name of the caller for the local initiator and participant interfaces, or the remote transaction manager name or authentication principal for the TM to TM protocols. The access control information can also lists action allowed or denied. The actions may be further qualified by the connection type. Actions can include:

Initiator
   BeginTransaction
   Marshal
   UnMarshal
Local Participant
   EnlistDurable
   EnlistVolatile
TM-to-TM Protocol and Gateway
   PropagateTo
   PropagateFrom Thus entries can be of the format:
Component A, allow (EnlistDurable(XA), BeginTransaction, Marshal, Unmarshal), deny (enlist (oletx))
Component B, allow (propagateFrom), deny(propagateTo)
Where "XA" and "oletx" refer to specified connection types.

Thus, when a propagation message arrives from transaction manager over a protocol supported through a gateway, the message can go through the authorization checks that are internal to the protocol. For example with WS-AT, the arrival of the propagation message triggers a check against an internal 'white list'. The message contains a set of claims that are used to identify the remote transaction manager Initially, the request may be denied based on network configuration settings. The WS-AT protocol service then checks for claims that match an entry in its access control list. If a match is found, the request is either allowed or denied based on the entry. If no match is found, the protocol handler looks for a 'default' access control entry, and allows or denies the request based on that entry instead. If no default entry is found, the request can be denied or allowed, depending on configuration.

If a transaction initiation request comes from an initiator service, the request goes through an authorization check using the initiating caller's identity as the principal. This performs an access control check within the operating system using the approach described above. Furthermore, if the authorization check succeeds, the originating principal is attached to the transaction as a property that can be used later.

If a propagation message arrives from another transaction manager over a protocol directly supported by an operating system, the propagation message is processed by the operating system using the remote transaction manager name as the principal. The propagation message is then checked against the access control list using the initiating principal, if one is known. This allows access control lists that, say, disallow component A from performing transactions that use the TIP protocol to talk to a transaction manager.

When a transaction manager receives an enlistment request from a local participant, the request can use the caller's identity as the principal. The authorization check can in turn be performed in a similar manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a transaction manager, the transaction manager configured to interoperate with one or more other transaction related components to perform transaction related operations within distributed transactions in accordance with a two-phase commit protocol, the one or more other transaction related components selected from among: applications, resource managers, databases, message queues, and other transaction managers, a method for controlling a distributed transaction based on role based transaction control information listing transaction related operations the one or more other transaction related components are permitted to assume relative to the transaction manager, the method comprising:

an act of the transaction manager receiving a transaction related message, including a request from a transaction related component to perform a requested transaction related operation within the distributed transaction in accordance with the two-phase commit protocol on behalf of the transaction related component, the requested transaction related operation instructing the transaction manager to communicate with at least one other transaction related component on behalf of the transaction related component, the requested transaction related operation selected from among: beginning a transaction, marshalling data for a transaction, unmarshalling data for a transaction, enlisting in a transaction, propagating data from the transaction manager, and propagating data to the transaction manager, the corresponding transaction to include the transaction manager, the transaction related component, and the at least one other transaction related component as participants;

in response to receiving the transaction related message:

an act of the transaction manager authenticating that the transaction related message originated from the transaction related component;

an act of the transaction manager referring to the role based transaction control information in response to receiving authentication that the transaction related message originated from the transaction related component, the role based transaction control information having been previously configured by a user and expressly listing transaction related operations the transaction related component is permitted to perform relative to the transaction manager for transactions in which the transaction manager and the transaction related component are participants, the listing permitting the transaction manager to perform transaction related operations on behalf of the transaction related component including one or more of: beginning a transaction, marshalling data for a transaction, unmarshalling data for a transaction, enlisting in a transaction, propagating data from the transaction manager, and propagating data to the transaction manager;

an act of comparing the requested transaction related operation to the role based transaction control information to determine if the transaction related component is permitted to assume a role of the requested transaction related operation relative to the transaction manager that allows the transaction manager to perform the requested transaction related operation on behalf of the transaction related component; and an act of implementing the requested transaction related operation in accordance with the results of the comparison.

2. The method as recited in claim 1, wherein the act of the transaction manager authenticating that the transaction related message originated from the transaction related component comprises an act of authenticating using at least one of X.509 certificate thumbprints and Kerberos tickets.

3. The method as recited in claim 1, wherein the act of referring to the role based transaction control information comprises an act of referring to transaction control information that indicates the transaction manager is permitted to perform the requested transaction related operation on behalf of the transaction related component.

4. The method as recited in claim 1, wherein the act of referring to the role based transaction control information comprises an act of referring to transaction control information that indicates the transaction manager is not permitted to perform the requested transaction related operation on behalf of the transaction related component.

5. The method as recited in claim 1, wherein the act of referring to the role based transaction control information comprises an act of referring to transaction control information maintained by an operating system.

6. The method as recited in claim 1, wherein the act of referring to the role based transaction control information comprises an act of referring to transaction control information received from a second transaction manager using a transaction manager to transaction manager protocol.

7. The method as recited in claim 1, wherein the act of implementing the requested transaction related operation in accordance with the results of the comparison comprises an act of the transaction manager performing the requested transaction related operation on behalf of the transaction related component to communicate with the at least one other transaction related component on behalf of the transaction related component.

8. The method as recited in claim 1, wherein the act of implementing the requested transaction related operation in accordance with the results of the comparison comprises an act of the transaction manager preventing the requested transaction related operation from occurring when the transaction related operation is not a permitted transaction related operation for the transaction related component.

9. The method as recited in claim 1, wherein the act of referring to the role based transaction control information comprises referring to expressly defined entries for transaction related components, including the transaction related component, each expressly defined entry listing:
  a transaction related component; and
  one or more permitted transaction related operations the transaction manager is permitted to perform on behalf of the transaction related component, the transaction related operations selected from among: initiating a transaction, marshalling a transaction, unmarshalling a transaction, propagating a transaction, receiving a propagated transaction, enlisting in a transaction, becoming a subordinate transaction manager, and becoming a superior transaction manager.

10. The method as recited in claim 9, wherein the act of comparing the requested transaction related operation to the role based transaction control information comprises an act of comparing the transaction related operation to expressly permitted transaction related operations listed in the expressly defined entry for the transaction related component.

11. The method as recited in claim 1, further comprising:
  an act of the transaction manager receiving a second transaction related message from the at least one other transaction related component to perform a second requested transaction related operation on behalf of the at least one other transaction related component, the second requested transaction related operation responsive to the transaction related operation; and
  in response to receiving the second transaction related message:
    an act of the transaction manager authenticating that the second transaction related message originated from the at least one other transaction related component;
    an act of the transaction manager referring to role based transaction control information in response to receiving authentication that the second transaction related message originated from the at least one other transaction related component, the role based transaction control information expressly listing roles the at least one other transaction related component is permitted to assume relative to the transaction manager for transactions in which the transaction manager and the at least one other transaction related component are participants, the roles permitting the transaction manager to perform transaction related operations on behalf of the at least one other transaction related component;
    an act of comparing the second requested transaction related operation to the role based transaction control information to determine if the at least one other transaction related component is permitted to assume a role relative to the transaction manager that allows the transaction manager to perform the second requested transaction related operation on behalf of the at least one other transaction related component; and
    an act of implementing the second requested transaction related operation in accordance with the results of the comparison.

12. The method as recited in claim 11, wherein the at least one other transaction related component comprises a resource manager, and wherein the second requested transaction related operation comprises enlisting in the transaction.

13. The method as recited in claim 11, wherein the at least one other transaction related component comprises a message queue, and wherein the second requested transaction related operation comprises storing a message.

14. A computer program product for use at a computer system, the computer system including a transaction manager, the transaction manager configured to interoperate with one or more other transaction related components to perform transaction related operations within distributed transactions in accordance with a two-phase commit protocol, the one or more other transaction related components selected from among: applications, resource managers, databases, message queues, and other transaction managers, the computer program product for implementing a method controlling a distributed transaction based on role based transaction control information listing transaction related operations the one or more other transaction related components are permitted to assume relative to the transaction manager, the computer program product comprising one or more computer storage media having stored thereon computer-executable instructions that, when executed by a processor, cause the transaction manager to perform the following:
  receive a transaction related message, including a request from a transaction related component to perform a requested transaction related operation within the distributed transaction in accordance with the two-phase commit protocol on behalf of the transaction related component, the requested transaction related operation instructing the transaction manager to communicate with at least one other transaction related component on behalf of the transaction related component, the requested transaction related operation selected from among: beginning a transaction, marshalling data for a transaction, unmarshalling data for a transaction, enlisting in a transaction, propagating data from the transaction manager, and propagating data to the transaction manager, the corresponding transaction to include the transaction manager, the transaction related component, and the at least one other transaction related component as participants;
  in response to receiving the transaction related message:
    authenticate that the transaction related message originated from the transaction related component;
    refer to the role based transaction control information in response to receiving authentication that the transaction related message originated from the transaction related component, the role based transaction control information having been previously configured by a user and expressly listing transaction related operations the transaction related component is permitted to perform relative to the transaction manager for transactions in which the transaction manager and the transaction related component are participants, the listing permitting the transaction manager to perform transaction related operations on behalf of the transaction related component including one or more of: beginning a transaction, marshalling data for a transaction, unmarshalling data for a transaction, enlisting in a transaction, propagating data from the transaction manager, and propagating data to the transaction manager;

compare the requested transaction related operation to the role based transaction control information to determine if the transaction related component is permitted to assume a role of the requested transaction related operation relative to the transaction manager that allows the transaction manager to perform the requested transaction related operation on behalf of the transaction related component; and implement the requested transaction related operation in accordance with the results of the comparison.

15. The computer program product as recited in claim 14, wherein computer-executable instructions that, when executed, cause the transaction manager to implement the requested transaction related operation in accordance with the results of the comparison comprise computer-executable instructions that, when executed, cause the transaction manager to prevent the requested transaction related operation from occurring.

16. The computer program product as recited in claim 14, wherein computer-executable instructions that, when executed, cause the transaction manager to refer to the role based transaction control information comprise computer-executable instructions that, when executed, cause the transaction manager to refer to expressly defined entries for transaction related components, including the transaction related component, each expressly defined entry listing:

a transaction related component; and one or more permitted transaction related operations the transaction manager is permitted to perform on behalf of the transaction related component, the transaction related operations selected from among: initiating a transaction, marshalling a transaction, unmarshalling a transaction, propagating a transaction, receiving a propagated transaction, enlisting in a transaction, becoming a subordinate transaction manager, and becoming a superior transaction manager.

17. The computer program product as recited in claim 16, wherein computer-executable instructions that, when executed, cause the transaction manager to compare the requested transaction related operation to the role based transaction control information comprise computer-executable instructions that, when executed, cause the transaction manager to compare the requested transaction related operation to permitted transaction related operations listed in the expressly defined entry for the transaction related component.

18. The computer program product as recited in claim 14, wherein computer-executable instructions that, when executed, when executed by a processor, cause the transaction manager to further perform the following:

receive a second transaction related message from the at least one other transaction related component to perform a second requested transaction related operation on behalf of the at least one other transaction related component, the second requested transaction related operation responsive to the transaction related operation; and in response to receiving the second transaction related message:

authenticate that the second transaction related message originated from the at least one other transaction related component;

refer to role based transaction control information in response to receiving authentication that the second transaction related message originated from the at least one other transaction related component, the role based transaction control information expressly listing roles the at least one other transaction related component is permitted to assume relative to the transaction manager for transactions in which the transaction manager and the at least one other transaction related component are participants, the roles permitting the transaction manager to perform transaction related operations on behalf of the at least one other transaction related component;

compare the second requested transaction related operation to the role based transaction control information to determine if the at least one other transaction related component is permitted to assume a role relative to the transaction manager that allows the transaction manager to perform the second requested transaction related operation on behalf of the at least one other transaction related component; and implement the second requested transaction related operation in accordance with the results of the comparison.

19. The computer program product as recited in claim 18, wherein the at least one other transaction related component comprises a resource manager, and wherein the second requested transaction related operation comprises enlisting in the transaction.

20. A computer system, comprising:

one or more processors;

a system memory; and one or more computer-readable media having stored thereon a transaction manager, the transaction manger configured to perform operations related to distributed transactions in accordance with a two-phase commit protocol based on role based transaction control information listing transaction related operations the one or more other transaction related components are permitted to assume relative to the transaction manager, wherein the distributed transactions are to include the transaction manager and one or more additional other components, the one or more additional other components selected from among: applications, resource managers, databases, message queues, and other transaction managers, including being configured to:

receive a transaction related message from an application, the transaction related message indicating a request by the application for the transaction manager to perform a begin transaction operation within a distributed transaction in accordance with the two-phase commit protocol, the transaction related message indicating that the transaction is to include at least the transaction manager, the application, and a second transaction manager, wherein the second transaction manager is separated from the first transaction manager by a network boundary;

authenticate that the transaction related message originated from the application;

refer to the role based transaction control information in response to receiving authentication that the transaction related message originated from the application, the role based transaction control information having been previously configured by a user and expressly listing transaction related operations the application and the second transaction manager are permitted to perform relative to the transaction manager for transactions in which the transaction manager, the application, and the second transaction manager are participants, the role based transaction control information including an entry for each of the application and the second transaction manager, the listing permitting the transaction manager to perform one or more transaction related operations on behalf of the application and the second transaction manager, the one or more transaction related operations selected from among: beginning a transaction, marshalling data for a transaction, unmarshalling data for a transaction, enlisting in a transaction, propagating data from the transaction manager, propagating data to the transaction manager, become a subordinate transaction manager to the transaction manager, and become a superior transaction manager to the transaction manager;

compare the begin transaction operation to the role based transaction control information in the entry for the application to determine if the application is permitted to perform a first transaction related operation relative to the transaction manager that allows the transaction manager to begin a transaction in response to a request from the application;

determine that the transaction manager is permitted to begin transactions in response to a request from the application based on the results of the comparison;

initiate a transaction that is to include the transaction manager, the application, and the second transaction manager in response to the application request;

receive a transaction manager request from the second transaction manager to perform a second transaction related operation of becoming either superior or subordinate transaction manager to the second transaction manager;

authenticate that the transaction manager request originated from the second transaction manager;

refer to the role based transaction control information in response to receiving authentication that the transaction related message originated from the second transaction manager;

compare the transaction related operation to the role based transaction control information in the entry for the second transaction manger to determine if the second transaction manager is permitted to perform the second transaction related operation relative to the transaction manager that allows the transaction manager to become either superior or subordinate to the second transaction manager;

determine that the second transaction manager is permitted to perform the second transaction related operation relative to the transaction manager that allows the transaction manager to become either superior or subordinate to the second transaction manager;

cause the transaction manager to become either superior or subordinate to the second transaction manger in response to receiving the transaction manager request; and simultaneously participate in the transaction, along with the application and the second transaction manager, to transfer data from the application to the second transaction manager in accordance with the two-phase commit protocol.

\* \* \* \* \*